United States Patent
Kuwasaki

(10) Patent No.: US 8,345,288 B2
(45) Date of Patent: Jan. 1, 2013

(54) IMAGE FORMING SYSTEM AND IMAGE FORMING APPARATUS

(75) Inventor: Naoki Kuwasaki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 908 days.

(21) Appl. No.: 12/437,750

(22) Filed: May 8, 2009

(65) Prior Publication Data

US 2010/0023589 A1 Jan. 28, 2010

(30) Foreign Application Priority Data

Jul. 22, 2008 (JP) ................................. 2008-188227

(51) Int. Cl.
*G06F 3/12* (2006.01)
*G06F 15/16* (2006.01)
*G06F 9/44* (2006.01)

(52) U.S. Cl. ....... 358/1.15; 709/206; 709/202; 709/230; 709/203; 709/217; 709/227; 717/100

(58) Field of Classification Search .................. 358/1.15; 709/206, 202, 230; 713/193; 715/856; 717/100; 714/748; 719/310; 386/241
See application file for complete search history.

(56) References Cited

U.S. PATENT DOCUMENTS

| | | | |
|---|---|---|---|
| 2003/0225894 A1* | 12/2003 | Ito ................................ | 709/227 |
| 2003/0229883 A1* | 12/2003 | Savov et al. .................. | 717/100 |
| 2004/0088371 A1* | 5/2004 | Hiramatsu et al. ........... | 709/217 |
| 2004/0236862 A1* | 11/2004 | Ito et al. ........................ | 709/230 |
| 2008/0144098 A1* | 6/2008 | Ishigaki ........................ | 358/1.15 |
| 2010/0020352 A1* | 1/2010 | Morimoto ..................... | 358/1.15 |
| 2010/0023588 A1* | 1/2010 | Yamaguchi ................... | 709/206 |

FOREIGN PATENT DOCUMENTS

| | | |
|---|---|---|
| JP | 2001-088408 | 4/2001 |
| JP | 2001-306285 | 11/2001 |
| JP | 2004-297785 | 10/2004 |
| JP | 2006-018376 | 1/2006 |

OTHER PUBLICATIONS

Japanese Office Action 2008-182413 dated May 8, 2012, 3 pages.

* cited by examiner

*Primary Examiner* — Charlotte M Baker
*Assistant Examiner* — Rury Grisham
(74) *Attorney, Agent, or Firm* — K&L Gates LLP

(57) ABSTRACT

An image forming apparatus includes a data storage device that stores list data, and a simple object access protocol (SOAP) processor. When a partial-list-data-request message is received from a client apparatus by a communication processor, the SOAP processor generates a response message including a partial list data items that have not been sent among the plurality of partial list data items that are generated by dividing the list data, and causes the communication processor to send the response message to the client apparatus. The client apparatus includes a SOAP processor that causes a communication processor to send the partial-list-data-request message to the image forming apparatus, and that, when the response message including the partial list data item is received from the image forming apparatus by the communication processor, extracts the partial list data item from the response message.

19 Claims, 2 Drawing Sheets

IMAGE FORMING SYSTEM AND IMAGE FORMING APPARATUS

INCORPORATION BY REFERENCE

This application is based upon and claims the benefit of priority from the corresponding Japanese Patent Application No. 2008-188227, filed Jul. 22, 2008, the entire contents of which is incorporated herein by reference.

BACKGROUND

1. Field of the Invention

The present invention relates to an image forming system and an image forming apparatus.

2. Description of the Related Art

Among image forming apparatuses such as printers, there are some image forming apparatuses that, in addition to printing data, send and receive data by communicating with terminal apparatuses or other image forming apparatuses. When list data, such as user list data or address-book data, including a plurality of data values is to be obtained from an image forming apparatus, the image forming apparatus sends the entire list data at one time.

The size of list data is increasing due to the greater functionality in image forming apparatuses. Accordingly, when the entire list data is sent to a client apparatus at one time, no other process can be performed in the client apparatus period from the time when the request to send the list data is sent to an image forming apparatus to the time when the entire list data is completed. For this reason, other processes are interrupted in some cases for a long period of time.

SUMMARY

The present invention relates to image forming systems and image forming apparatuses that can prevent other processes from being continuously interrupted for long periods of time in a client apparatus, while the client apparatus obtains list data from an image forming apparatus.

According to an embodiment of the present invention, an image forming system is provided that includes an image forming apparatus connected to a computer network and a client apparatus connected to the computer network.

The image forming apparatus includes the following elements: a data storage device configured to store list data including a plurality of data values; a first communication processor configured to receive a partial-list-data-request message and to send a response message including partial list data item; and a first message processor configured to, when the first communication processor receives the partial-list-data-request message from the client apparatus, generate the response message including the partial list data items that have not been sent with the plurality of partial list data items that are created by dividing the list data and to cause the first communication processor to send the response message to the client apparatus.

The client apparatus includes the following elements: a second communication processor configured to send the partial-list-data-request message and to receive the response message including a partial list data item; and a second message processor configured to cause the second communication processor to send the partial-list-data-request message to the image forming apparatus and to, when the response message including the partial list data item is received by the second communication processor, extract the partial list data item from the response message.

Additional features and advantages are described herein, and will be apparent from the following Detailed Description and the figures.

DETAILED DESCRIPTION

Figure 1:
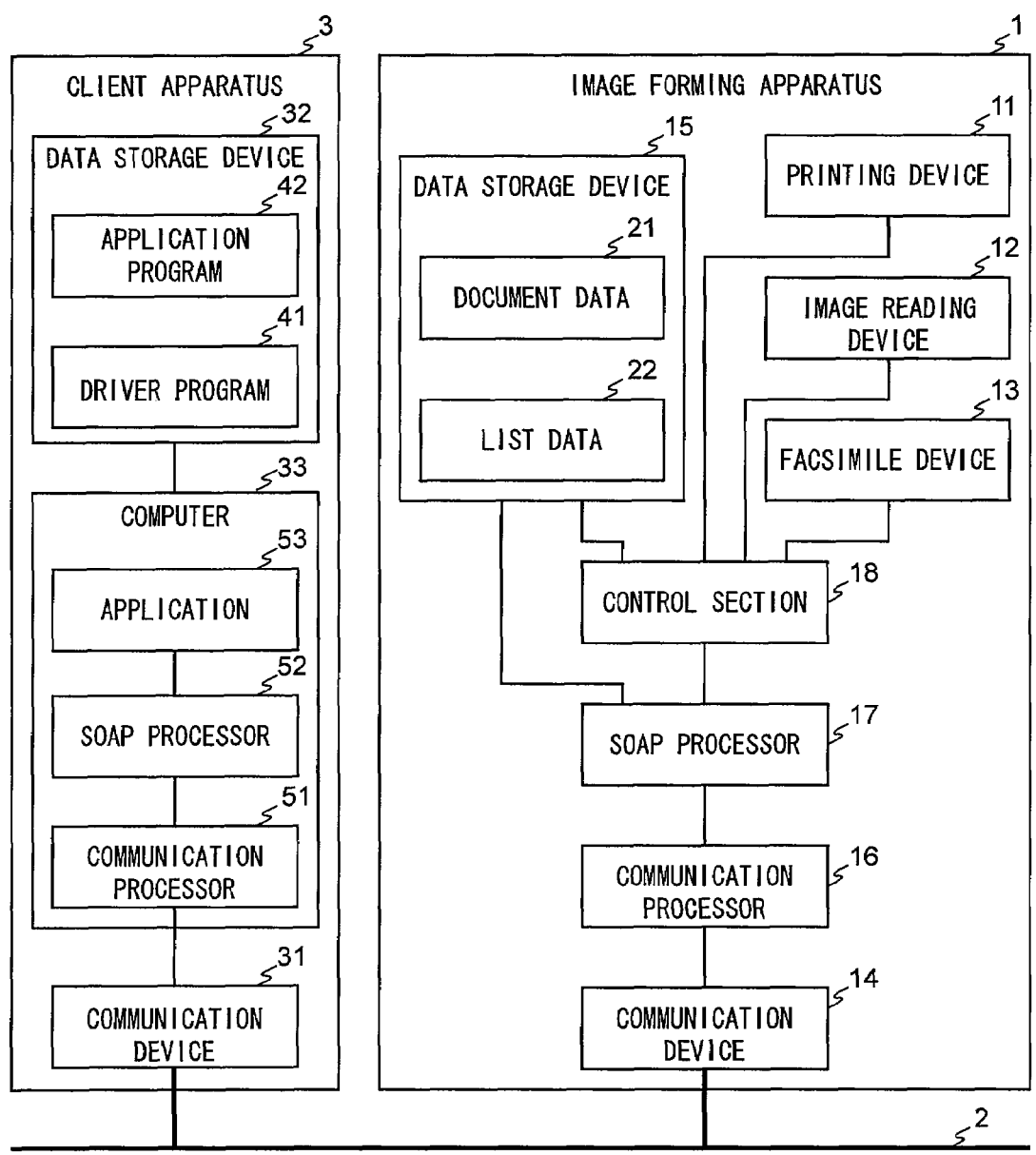
FIG. 1 is a schematic block diagram of a configuration of an image forming system according to an embodiment of the present invention.

FIG. 1 is a schematic block diagram of a configuration of an image forming system according to an embodiment of the present invention. In the image forming system illustrated in FIG. 1, an image forming apparatus 1 is connected to a computer network 2 and a client apparatus 3 is connected to the computer network 2. The image forming apparatus 1 has a printing function, an image reading function, and/or a facsimile sending/receiving function. The computer network 2 is a network such as a local area network (LAN) or a wide area network (WAN). The client apparatus 3 is, for example, a personal computer.

The image forming apparatus 1 includes a printing device 11, an image reading device 12, a facsimile device 13, a communication device 14, a data storage device 15, a communication processor 16, a simple object access protocol (SOAP) processor 17, and a control section 18.

The printing device 11 is a device that can print a document image using document data. The image reading device 12 is a device that can optically read a document image from document data and generate image data of the document image. The facsimile device 13 is a device that can generate a facsimile signal from the document data which should be sent, send a facsimile signal, receive a facsimile signal, and can convert the facsimile signal into document data.

The communication device 14 is connected to the computer network 2 and performs data communication between the communication device 14 and another apparatus (herein, the client apparatus 3) that is connected to the computer network 2. For example, a network interface card (NIC) may be used as the communication device 14.

The data storage device 15 stores document data 21 and list data 22. A hard disk drive, a non-volatile memory, or the like may be used as the data storage device 15. The document data 21 may include image data that is generated by reading an image with the image reading device 12, image data that is generated from the facsimile signal which is received by the facsimile device 13, image data that is backup data of an image which is printed by the printing device 11, image data that is backup data of an image which is sent from the facsimile device 13, or the like. The list data 22 is a series of data items including a plurality of data values. The list data 22 may include, for example, user list data, workgroup-code list data, address-book data, job-10 g list data, or the like.

The communication processor 16 (an example of a first communication processor) performs data communication using a transmission control protocol (TCP)/internet protocol (IP) via the computer network 2 by controlling the communication device 14. Furthermore, the communication processor 16 has a client function and a server function of a hypertext transfer protocol (HTTP).

The SOAP processor 17 (an example of a first message processor) sends and receives a SOAP message by controlling the communication processor 16. The SOAP processor 17 receives request messages including a resource-secure-request message, a partial-list-data-request message, and a resource-cancel-request message, which are described below. The SOAP processor 17 sends response messages to the request messages. When a partial-list-data-request message is received from the client apparatus 3 by the communication processor 16, the SOAP processor 17 generates a response message including the partial list data items that have not been sent among the plurality of partial list data items constituting the list data 22 and causes the communication processor 16 to send the response message to the client apparatus 3. The partial-list-data-request message is a request message for obtaining the plurality of partial list data items that are created by dividing the list data 22 including the plurality of data values.

In this embodiment, the request messages and the response messages are SOAP messages. Furthermore, in this embodiment, the HTTP is bound as a lower-layer protocol of the SOAP and a uniform resource locator (URL) of an end point is set in advance for each of the image forming apparatus 1 and the client apparatus 3. The SOAP message is sent using a POST command of the HTTP to an end point that is a communication partner.

The control section 18 controls the internal devices including the printing device 11, the image reading device 12, the facsimile device 13, and so forth, and performs a job that is requested by the client apparatus 3 or that is requested through an operation panel (not illustrated). The control section 18 stores, in the data storage device 15, the document data 21 that is generated in each of various types of jobs, and monitors the state of the internal devices.

It should be noted that the communication processor 16, the SOAP processor 17, and the control section 18 are controlled by executing a predetermined program with an integral computer (not illustrated).

The client apparatus 3 has a communication device 31, a data storage device 32, and a computer 33.

The communication device 31 is connected to the computer network 2 and can communicate with another apparatus (herein, the image forming apparatus 1) which is connected to the computer network 2. For example, a NIC may be used as the communication device 31.

The data storage device 32 stores a driver program 41 and an application program 42. A hard disk drive, a non-volatile memory, or the like may be used as the data storage device 32. It should be noted that the driver program 41 may be stored in a mobile recording medium such as a compact disc read-only memory (CD-ROM) and that the data storage device 32 may be used as a driver device which reads the driver program 41 from the recording medium.

The computer 33 includes a central processing unit (CPU) (not illustrated), a random access memory (RAM), a read-only memory (ROM), and so forth. The computer 33 achieves various types of processors by loading programs into the RAM and executing the programs with the CPU. The driver program 41 is executed by the computer 33, thereby providing a communication processor 51 (an example of a second communication processor) and a SOAP processor 52 (an example of a second message processor). The driver program 41 is an example of a computer program. The application program 42 is executed by the computer 33, thereby providing the application 53.

The communication processor 51 performs data communication using the TCP/IP via the computer network 2 by controlling the communication device 31. Furthermore, the communication processor 51 has a client function and a server function of the HTTP.

The SOAP processor 52 sends and receives the SOAP message by controlling the communication processor 51. The SOAP processor 52 sends request messages including a resource-secure-request message, a partial-list-data-request message, and a resource-cancel-request message, which are described below, and receives response messages to the request messages. The SOAP processor 52 causes the communication processor 51 to send the partial-list-data-request message to the image forming apparatus 1. In addition, when the response message including the partial list data item is received from the image forming apparatus 1 by the communication processor 51, the SOAP processor 52 extracts the partial list data item from the response message.

The application 53 is a processor that obtains the list data 22 which is stored in the image forming apparatus 1.

Figure 2:
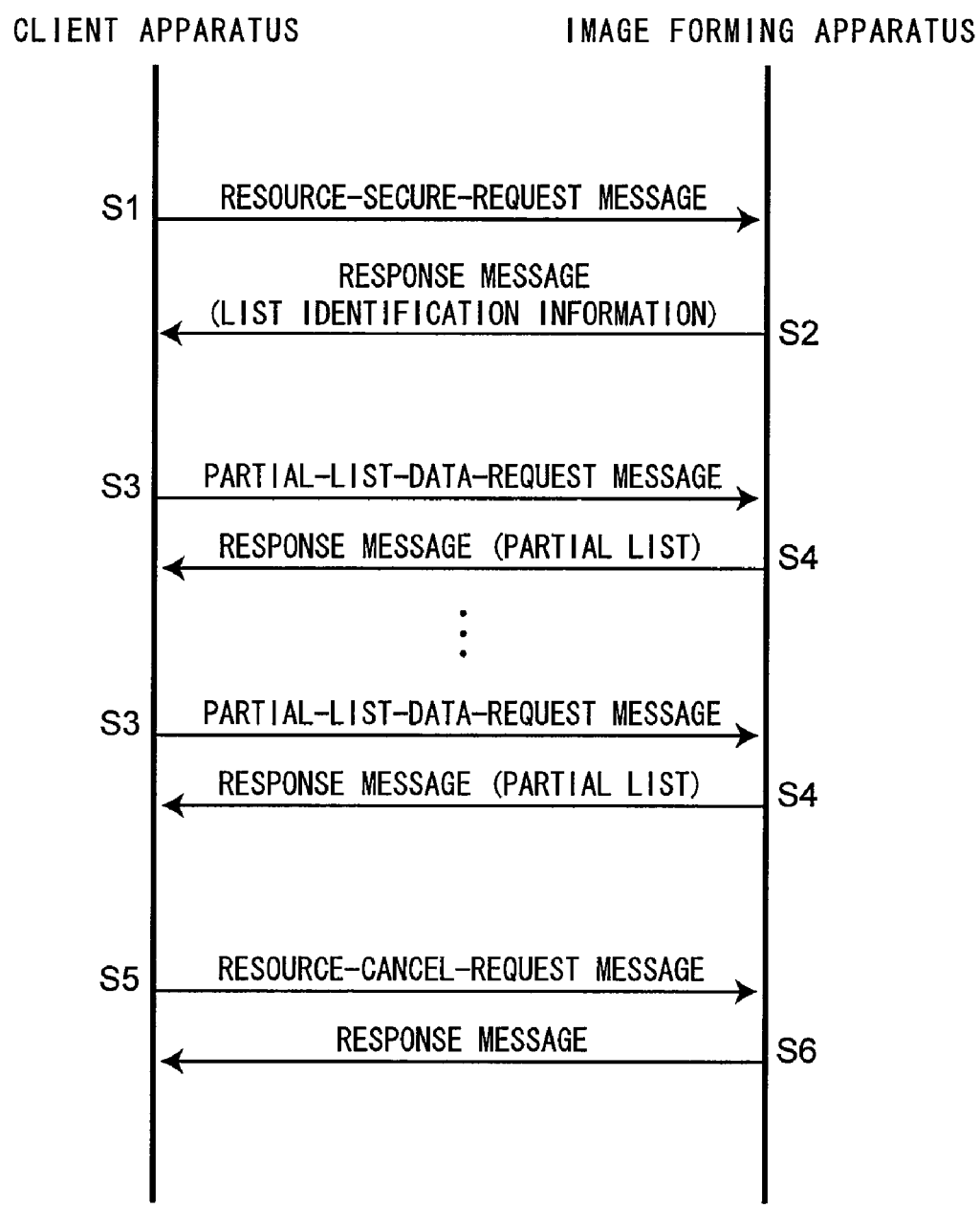
FIG. 2 is a schematic diagram of a process in which a client apparatus obtains list data from an image forming apparatus in the image forming system of FIG. 1.

Next, operations of the respective devices in the image forming system will be described. FIG. 2 is a schematic diagram of a process in which the client apparatus 3 obtains the list data 22 from the image forming apparatus 1 in the image forming system illustrated in FIG. 1.

The application 53 of the client apparatus 3 causes the SOAP processor 52 to obtain the list data 22 when the step of obtaining the list data 22 is performed.

The SOAP processor 52 causes the communication processor 51 to send the resource-secure-request message to the image forming apparatus 1 (step S1). The communication processor 51 sends the resource-secure-request message to the image forming apparatus 1 with the POST command of the HTTP. The resource-secure-request message is transmitted via the communication device 31, the computer network 2, and the communication device 14, and received by the communication processor 16 of the image forming apparatus 1. The communication processor 16 supplies, to the SOAP processor 17, the resource-secure-request message that is received using the HTTP.

When the resource-secure-request message is received, the SOAP processor 17 secures a resource that is necessary to send the partial list data items, which are created by dividing the list data 22. The number of data values that are included in each of the partial list data items, and so forth are specified in the resource-secure-request message, and a necessary resource (a dynamic memory area or the like) is secured in accordance with the specification. For example, in a situation wherein the number of data values that are included in each of the partial list data items is 100, and the total number of data values that are included in the list data 22 is 1000, sending of the partial list data item is performed ten times.

When securing the resource is completed, the SOAP processor 17 generates the response message and causes the communication processor 16 to send the response message to the client apparatus 3 (step S2). In the response message, list-data identification information for identifying the list data 22 that is to be sent, sending progress information specifying which partial list data items among the series of the partial list data items have already been sent, and so forth are included. The communication processor 16 sends the response message to the client apparatus 3 with the POST command of the HTTP. The response message is transmitted via the communication device 14, the computer network 2, and the communication device 31, and received by the communication processor 51 of the client apparatus 3. The communication processor 51 supplies, to the SOAP processor 52, the response message for the resource-secure-request message that is received using the HTTP.

After the response message for the resource-secure-request message is received, the SOAP processor 52 of the client apparatus 3 causes the communication processor 51 to send the first partial-list-data-request message to the image forming apparatus 1 (step S3). The partial-list-data-request message is sent from the communication processor 51 to the communication processor 16, and supplied to the SOAP processor 17 of the image forming apparatus 1. The partial-list-data-request message includes the list-data identification information, the sending progress information, and so forth.

When the partial-list-data-request message is received, the SOAP processor 17 of the image forming apparatus 1 identifies, based on the list-data identification information, the sending progress information, and so forth, the partial list data item to be sent, among the partial list data items that are created by dividing the list data 22. The SOAP processor 17 generates the response message, including the identified partial list data item, and causes the communication processor 16 to send the response message to the client apparatus 3 (step S4). In addition to the partial list data item, the list-data identification information, the sending progress information, and so forth are included in the response message. The response message is sent form the communication processor 16 to the communication processor 51, and supplied to the SOAP processor 52 of the client apparatus 3. The SOAP processor 52 extracts the partial list data item from the response message.

The SOAP processor 52 of the client apparatus 3 then causes the communication processor 51 to repeat sending of the partial-list-data-request message in order to sequentially obtain the partial list data items until the response message for the last partial-list-data-request message is received (step S3). The SOAP processor 52 obtains each response message via the communication processor 51 and so forth (step S4). The SOAP processor 52 of the client apparatus 3 extracts the last partial list data item from the response message for the last partial-list-data-request message, and reconstructs the list data 22 from the obtained partial list data items. After that, the SOAP processor 52 causes the communication processor 51 to send the resource-cancel-request message to the image forming apparatus 1 (step S5). The resource-cancel-request message is sent from the communication processor 51 to the communication processor 16, and supplied to the SOAP processor 17 of the image forming apparatus 1. The resource-cancel-request message includes the list-data identification information.

When the resource-cancel-request message is received, the SOAP processor 17 of the image forming apparatus 1 cancels the resource that has been secured for sending the partial list data items which were created by dividing the list data 22 that was identified based on the list-data identification information. After that, the SOAP processor 17 causes the communication processor 16 to send a response message for the resource-cancel-request message to the client apparatus 3 (step S6). The response message is sent from the communication processor 16 to the communication processor 51, and supplied to the SOAP processor 52 of the client apparatus 3. When the SOAP processor 52 obtains the response message, the SOAP processor 52 notifies the application 53 that it has completed obtaining the list data 22, and supplies the list data 22.

As described above, according to the embodiment of the present invention, the image forming apparatus 1 includes the following elements: the data storage device 15 that stores the list data 22 including the plurality of data values; the communication processor 16 that receives a partial-list-data-request message and that sends the response message including the partial list data item; and the SOAP processor 17 that, when the partial-list-data-request message is received from the client apparatus 3 by the communication processor 16, generates the response message including the partial list data items that have not been sent among a plurality of partial list data items that are created by dividing the list data 22, and causes the communication processor 16 to send the response message to the client apparatus 3.

The client apparatus 3 includes the following elements: the communication processor 51 that sends the partial-list-data-request message and that receives the response message including the partial list data item; and the SOAP processor 52 that causes the communication processor 51 to send the partial-list-data-request message to the image forming apparatus 1, and that, when the response message including a partial list data item is received from the image forming apparatus 1 by the communication processor 51, extracts the partial list data item from the response message.

With this configuration, since the list data 22 is divided into partial list data items and each of the partial list data items is sent from the image forming apparatus 1 to the client apparatus 3, other processes can be performed during the period when the step of obtaining the partial list data item is not being performed.

Accordingly, when the list data 22 from the image forming apparatus 1 is being received, other processes do not have to be continuously interrupted for a long period of time in the client apparatus 3. Furthermore, in order to send the list data 22, the resource that is to be used to send the partial list data items can be secured in the image forming apparatus 1. Thus, a resource having only a small capacity is necessary.

Additionally, according to the above-described embodiment, before the SOAP processor 52 of the client apparatus 3 causes the communication processor 51 to send the first partial-list-data-request message to the image forming apparatus 1, the SOAP processor 52 causes the communication processor 51 to send the resource-secure-request message to the image forming apparatus 1. When the resource-secure-request message is received by the communication processor 16, the SOAP processor 17 of the image forming apparatus 1 secures the resource that is necessary to send the partial list data items.

In this manner, since securing of the resource that is necessary to send the partial list data items can be performed in advance in the image forming apparatus 1, the time necessary to send the list data 22 can be reduced.

Furthermore, according to the above-described embodiment, after the response message including the last partial list data item is received from the image forming apparatus 1, the SOAP processor 52 of the client apparatus 3 causes the communication processor 51 to send the resource-cancel-request message to the image forming apparatus 1. When the resource-cancel-request message is received by the communication processor 16, the SOAP processor 17 of the image forming apparatus 1 cancels the resource that has been secured for sending the partial list data items.

In this manner, the resource is only temporarily secured when the partial list data items are sent, and the resource is immediately released after sending of the partial list data items is completed. Thus, the resource can be efficiently used.

In addition, according to the above-described embodiment, the list-data identification information is included in each message. In this manner, because resources that are each used to send a corresponding one of the plurality of list data items 22 are separately identified in corresponding list-data identification information items, the plurality of list data items 22 can be separately obtained in parallel.

The present invention includes various other embodiments. For example, other designs can be used in which the above-described components and steps are each performed.

By way of example, although the sending progress information is included in each message in the above-described embodiment, the sending progress information does not necessarily need to be included in each message. The sending progress information may be stored in the image forming apparatus 1, and may be managed by the SOAP processor 17. In this situation, the SOAP processor 17 causes the RAM (not illustrated) or the like to store the sending progress information, and updates the sending progress information every time the partial list data item is sent. Furthermore, the sending progress information may also be stored in the client apparatus 3, and the SOAP processor 52 may also update the sending progress information every time the response message including the partial list data item is received.

Additionally, in the above-described embodiment, the resource is secured before the first partial list data item is sent and the resource is cancelled after the last partial list data item is sent. However, when the partial-list-data-request message is received, the SOAP processor 17 may secure a resource that is necessary to send the partial list data item, and may cancel the secured resource after the response message including the partial list data item is sent.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming system comprising:
an image forming apparatus connected to a computer network; and
a client apparatus connected to the computer network,
the image forming apparatus including
a data storage device configured to store list data including a plurality of data values,
a first communication processor configured to receive a partial-list-data-request message and configured to send a response message including a partial list data item, and
a first message processor configured to, when the first communication processor receives the partial-list-data-request message from the client apparatus, generate the response message including the partial list data items that have not been sent among the plurality of partial list data items that are created by dividing the list data, and configured to cause the first communication processor to send the response message to the client apparatus,
the client apparatus including
a second communication processor configured to send the partial-list-data-request message, and configured to receive the response message including the partial list data item, and
a second message processor configured to cause the second communication processor to send the partial-list-data-request message to the image foaming apparatus, and configured to, when the response message including the partial list data item is received by the second communication processor, extract the partial list data item from the response message;
wherein when the partial-list-data-request message is received, the first message processor secures a resource that is necessary to send the partial list data items, and, after the response message including the partial list data items is sent, the first message processor cancels the secured resource.

2. The image forming system according to claim 1, wherein the partial-list-data-request message and the response message are simple object access protocol (SOAP) messages.

3. The image forming system according to claim 2, wherein the partial-list-data-request message and the response message are sent and received using a POST command of a hypertext transfer protocol (HTTP).

4. The image forming system according to claim 1, wherein the partial-list-data-request message and/or the response message include information selected from the group consisting of list-data identification information for identifying the plurality of partial list data items constituting the list data and sending progress information indicating which partial list data items among the plurality of partial list data items that is provided as a series of the partial list data items have already been sent.

5. The image forming system according to claim 1, wherein the list data includes data selected from the group consisting of user list data, department-code list data, address-book data, and job-log list data.

6. The image forming system according to claim 1,
wherein the second message processor causes the second communication processor to repeat sending of the partial-list-data-request message to the image forming apparatus until all of the plurality of partial list data items constituting the list data are obtained, and
wherein the first message processor causes the first communication processor to send the response message including the partial list data item that have not been sent to the client apparatus until all of the plurality of partial list data items constituting the list data are sent.

7. The image forming system according to claim 1,
wherein, before the second message processor causes the second communication processor to send a first partial-list-data-request message to the image forming apparatus, the second message processor causes the second communication processor to send, to the image forming apparatus, a resource-secure-request message for securing a resource that is necessary to send the partial list data items, and
wherein, when the resource-secure-request message is received by the first communication processor, the first message processor secures the resource.

8. The image forming system according to claim 7, wherein the number of data values that are included in the plurality of partial list data items is specified in the resource-secure-request message.

9. The image forming system according to claim 7, wherein the resource is a dynamic memory area.

10. The image forming system according to claim 7, wherein the resource-secure-request message is a SOAP message.

11. The image forming system according to claim 10, wherein the resource-secure-request message is sent using a POST command of an HTTP.

12. The image forming system according to claim 7,
wherein, after the response message including a last partial list data item is received from the image forming apparatus, the second message processor causes the second communication processor to send, to the image forming apparatus, a resource-cancel-request message requesting cancellation of the resource that has been secured in accordance with the resource-secure-request message, and wherein, when the resource-cancel-request message is received by the first communication processor, the first message processor cancels the resource.

13. The image forming system according to claim 12, wherein the resource-cancel-request message is a SOAP message.

14. The image forming system according to claim 13, wherein the resource-cancel-request message is sent using a POST command of an HTTP.

15. An image forming system comprising:
an image forming apparatus connected to a computer network; and
a client apparatus connected to the computer network,
the image forming apparatus including
a data storage device configured to store list data including a plurality of data values,
a first communication processor configured to receive a partial-list-data-request message and configured to send a response message including a partial list data item, and
a first message processor configured to, when the first communication processor receives the partial-list-data-request message from the client apparatus, generate the response message including the partial list data items that have not been sent among the plurality of partial list data items that are created by dividing the list data, and configured to cause the first communication processor to send the response message to the client apparatus,
the client apparatus including
a second communication processor configured to send the partial-list-data-request message, and configured to receive the response message including the partial list data item, and
a second message processor configured to cause the second communication processor to send the partial-list-data-request message to the image forming apparatus, and configured to, when the response message including the partial list data item is received by the second communication processor, extract the partial list data item from the response message;
wherein, before the second message processor causes the second communication processor to send a first partial-list-data-request message to the image forming apparatus, the second message processor causes the second communication processor to send, to the image forming apparatus, a resource-secure-request message for securing a resource that is necessary to send partial list data items,
wherein, when the resource-secure-request message is received by the first communication processor, the first message processor secures the resource,
wherein, after the response message including a last partial list data item is received from the image forming apparatus, the second message processor causes the second communication processor to send, to the image forming apparatus, a resource-cancel-request message requesting cancellation of the resource that has been secured in accordance with the resource-secure-request message, and
wherein, when the resource-cancel-request message is received by the first communication processor, the first message processor cancels the resource.

16. An image foaming apparatus capable of communicating with a client apparatus via a computer network, the image forming apparatus comprising:
a data storage device configured to store list data including a plurality of data values;
a communication processor configured to receive a partial-list-data-request message, and configured to send a response message including a partial list data item; and
a message processor configured to, when the communication processor receives the partial-list-data-request message from the client apparatus generate the response message including the partial list data items that have not been sent among the plurality of partial list data items that are created by dividing the list data, and configured to cause the communication processor to send the response message to the client apparatus;
wherein when the partial-list-data-request message is received, the message processor secures a resource that is necessary to send the partial list data items, and, after the response message including the partial list data items is sent, the message processor cancels the secured resource.

17. The image forming apparatus according to claim 16, wherein the partial-list-data-request message and the response message are SOAP messages.

18. The image forming apparatus according to claim 17, wherein the partial-list-data-request message and the response message are sent and received using a POST command of an HTTP.

19. A method of operating an image forming apparatus capable of communicating with a client apparatus via a computer network comprising the steps of:
storing list data including a plurality of data values;
receiving a partial-list-data-request message, and sending a response message including a partial list data item; and
when a communication processor of the image forming apparatus receives the partial-list-data-request message from a client apparatus, generating the response message including the partial list data items that have not been sent among the plurality of partial list data items that are created by dividing the list data, and causing the communication processor to send the response message to the client apparatus;
wherein when the partial-list-data-request message is received, securing a resource that is necessary to send the partial list data items, and, after the response message including the partial list data items is sent, canceling the secured resource.

* * * * *